United States Patent [19]

Keogh

[11] 4,343,917

[45] Aug. 10, 1982

[54] WATER CURABLE, AMINO SILANE MODIFIED ALKYLENE-ALKYL ACRYLATE COPOLYMERS

[75] Inventor: Michael J. Keogh, Bridgewater, N.J.

[73] Assignee: Union Carbide Corporation, Danbury, Conn.

[21] Appl. No.: 250,443

[22] Filed: Apr. 2, 1981

Related U.S. Application Data

[63] Continuation-in-part of Ser. No. 70,785, Aug. 29, 1979, Pat. No. 4,291,136, which is a continuation-in-part of Ser. No. 892,153, Mar. 31, 1978, abandoned.

[51] Int. Cl.$^3$ .......................... C08L 23/36; H01B 7/28
[52] U.S. Cl. .................................... 525/106; 525/342; 528/26; 156/51; 174/110 SR

[58] Field of Search .............................. 525/102, 106; 174/110 SR

[56] References Cited

U.S. PATENT DOCUMENTS 3,408,420 10/1968 Wiggill ................................ 260/827
3,441,545 4/1969 Blatz et al. .......................... 525/106

Primary Examiner—Wilbert J. Briggs, Sr.
Attorney, Agent, or Firm—James C. Arvantes

[57] ABSTRACT

The disclosure of application is directed to water-curable, amino silane modified alkylene-alkyl acrylate copolymers, free of halide salts and halide ions, which can be extruded about electrical conductors to provide improved insulation thereon.

10 Claims, No Drawings

WATER CURABLE, AMINO SILANE MODIFIED ALKYLENE-ALKYL ACRYLATE COPOLYMERS

This application is a continuation-in-part of my copending application Ser. No. 070,785 filed Aug. 29, 1979, now U.S. Pat. No. 4,291,136, which in turn is a continuation-in-part of application Ser. No. 892,153 filed Mar. 31, 1978, now abandoned.

SUMMARY OF THE INVENTION

This application relates to water curable, amino silane modified alkylene-alkyl acrylate copolymers, free of halide salts and halide ions, which are particularly useful as extrudates about electrical conductors providing improved insulation thereon.

BACKGROUND OF THE INVENTION

Compositions based on olefinic polymers, which can be cured to crosslinked products, are commercially attractive systems which have found wide use in commerce as insulation about electrical wires and cables. Historically, cross-linking of these compositions has been effected by two basic processes referred to as peroxide curing and radiation curing.

Peroxide curing involves formulating a composition containing a peroxide, extruding the composition about an electrical conductor and thereafter subjecting the resultant product to elevated temperatures and pressures, usually by way of high pressure steam, in order to cure the extruded composition. Radiation curing involves utilizing an electron beam as the means for cross-linking in lieu of a peroxide.

Both peroxide curing and radiation curing have a number of deficiencies, including high capital investment for equipment and high energy utilization. In addition, peroxide curing involves another serious disadvantage. In peroxide curing, it is necessary to carefully control process conditions in order to avoid premature crosslinking of the composition in the equipment. When premature crosslinking occurs, the process has to be stopped and the crosslinked product removed from the system. Such interruption of the process is, of course, costly and adds to the overall cost of the product.

In view of the difficulties occasioned by peroxide curing and radiation curing, polymers have been prepared which can be crosslinked by simple exposure or contact with water, as for example, disclosed in U.S. Pat. No. 3,408,420 to John B. Wiggill, patented Oct. 29, 1968.

It has been found, however, that polymers of the type disclosed in the Wiggill Patent contain halide ions and/or halide salts. The presence of halide ions and/or halide salts increases the electrical conductivity of such polymers and also renders such polymers sensitive to moisture. Consequently, compositions containing these polymers have poorer insulating properties due to increased electrical conductivity and moisture sensitivity of the polymers.

The present invention provides polymers, free of halide salts and halide ions, which can be extruded about electrical conductors and water cured to crosslinked products characterized by improved insulating properties. As an added advantage, the polymers of this invention, being free of halide salts and halide ions, are not corrosive to equipment during the processing thereof.

The polymers of the present invention are water curable, amino silane modified alkylene-alkyl acrylate copolymers which contain alpha olefin units having the formula:

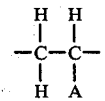

wherein A is hydrogen or an alkyl radical having 1 to 16 carbon atoms, these alpha units being present in the copolymers to the extent of at least 50 percent by weight;

at least 0.1 percent by weight of the polymerized units containing the radical having the formula:

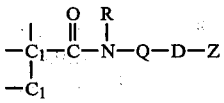

wherein: $C_1$ is a carbon atom in the main polymer chain, R is hydrogen or a hydrocarbon radical having one to 18 carbon atoms; Q is a divalent radical, such as a hydrocarbon radical having one to 18 carbon atoms and is bonded to —N— and D through carbon atoms; D is a silicon containing radical of the formula:

wherein V is hydrogen, a hydrocarbon radical of one to 18 carbon atoms or a hydrolyzable group; and Z is a hydrolyzable group; and polymerized units having the formula:

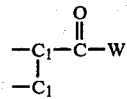

wherein, as stated $C_1$ is a carbon atom in the main polymer chain and W is an alkoxy radical having one to 18 carbon atoms.

A preferred copolymer is one wherein Q is —CH$_2$—CH$_2$— or —CH$_2$—CH$_2$—CH$_2$— and Z and V are methoxy, ethoxy or butoxy and A is alkyl, exemplified by alkyl radicals for R below, or hydrogen.

Illustrative of suitable hydrocarbon radicals for R are alkyl radicals having one to 18 carbon atoms, preferably one to 4 carbon atoms such as methyl, ethyl, n-propyl, isopropyl, n-butyl and the like, aryl radicals having 6 to 8 carbon atoms such as phenyl, benzyl, xylyl and the like.

Exemplary of suitable hydrocarbon radicals for Q are alkylene radicals having one to 18 carbon atoms, preferably one to 6 carbon atoms such as methylene, ethylene, propylene, butylene, hexylene and the like; alkoxy radicals having one to 18 carbon atoms, preferably one to 6 carbon atoms such as methyloxymethyl, methyloxypropyl, ethyloxyethyl, ethyloxypropyl, propyloxypropyl, propyloxybutyl, propyloxyhexyl and the like; arylene radicals such as phenylene and the like as well as radicals of the formula:

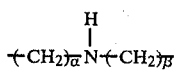

wherein α and β are integers of 1 to 3.

As stated, each V can be hydrogen, a hydrocarbon radical or a hydrolyzable group. Illustrative of suitable hydrocarbon radicals are alkyl radicals having one to 18 carbon atoms, preferably one to 6 carbon atoms, such as methyl, ethyl, n-propyl, isopropyl, n-butyl, n-hexyl dodecyl, and the like; alkoxy radicals having one to 18 carbon atoms such as methoxy, ethoxy, propoxy, hexoxy, dodecyloxy, methoxyethoxy and the like; aryl radicals having 6 to 8 carbon atoms such as phenyl, methylphenyl, ethylphenyl and the like; cycloaliphatic radicals having 5 to 8 carbon atoms such as cyclopentyl, cyclohexyl, cyclohexyloxy and the like.

Z, as previously stated, is a hydrolyzable group among which can be noted alkoxy radicals as previously described for R; oxy aryl radicals such as oxyphenyl and the like; oxyaliphatic radicals such as oxyhexyl and the like.

Also, W, as stated is an alkoxy radical having one to 18 carbon atoms, as defined for V.

The water curable, amino silane modified alkylene-alkyl acrylate copolymers of this invention can be prepared by reacting an alkylene-alkyl acrylate copolymer with an amino silane in the presence of an organo titanate as described in detail in my copending application Ser. No. 070,785 filed Aug. 29, 1979, now U.S. Pat. No. 4,291,136 the disclosure of which is incorporated by reference.

The alkylene-alkyl acrylate copolymers with which the amino silanes are reacted to form the silane modified copolymers are known polymers produced by reacting an alkene or mixtures thereof with an alkyl acrylate or mixtures thereof.

Suitable alkenes are ethylene, propylene, butene-1, isobutylene, pentene-1, 2-methylbutene-1, 3-methylbutene-1, hexene, heptene-1, octene-1, vinyl chloride, styrene and the like.

The alkylene moiety of the alkylene-alkyl acrylate copolymers generally contain from 2 to 18 carbon atoms, preferably 2 to 3 carbon atoms.

Suitable alkyl acrylate monomers which are copolymerized with the alkenes fall within the scope of the following formula:

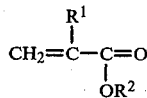

wherein $R^1$ is hydrogen or methyl and $R^2$ is alkyl having one to 12 carbon atoms. Illustrative compounds encompassed by this formula are: methyl acrylate, ethyl acrylate, t-butyl acrylate, methyl methacrylate, n-butyl acrylate, n-butyl-methacrylate, 2-ethylhexyl acrylate and the like.

Alkylene-alkyl acrylate copolymers generally have a density (ASTMD-1505 with a conditioning as in ASTMD-147-72) of about 0.92 to about 0.94 and a melt index (ASTMD-1238 of 44 psi tested pressure) of about 0.5 to about 500 decigrams per minute.

For purposes of the present invention, copolymers generally have about one to about 50 percent by weight combined alkyl acrylate, preferably about 2 to about 20 percent by weight combined alkyl acrylate.

The amino silanes which are reacted with the alkylene-alkyl acrylate copolymers are also known compounds and are illustrated by compounds falling within the scope of the following formula:

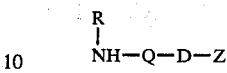

wherein R, Q, D and Z are as previously defined.

Exemplary of such compounds are the following:

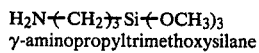
γ-aminopropyltrimethoxysilane

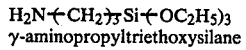
γ-aminopropyltriethoxysilane

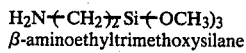
β-aminoethyltrimethoxysilane

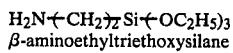
β-aminoethyltriethoxysilane

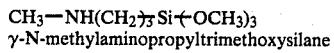
γ-N-methylaminopropyltrimethoxysilane

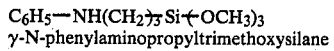
γ-N-phenylaminopropyltrimethoxysilane

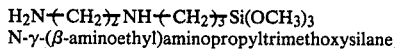
N-γ-(β-aminoethyl)aminopropyltrimethoxysilane

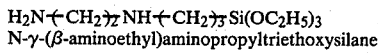
N-γ-(β-aminoethyl)aminopropyltriethoxysilane

The amount of amino silane used can vary from about 0.1 to about 10 percent by weight and preferably about 0.3 to about 5 percent by weight based on the weight of the copolymer.

Organo titanates, suitable to be used as catalysts in the preparation of the amino silane modified copolymers can be represented by the formula:

wherein each $R_1$ which can be the same or different, is hydrogen or a hydrocarbon radical having one to 18 carbon atoms, preferably one to 14 carbon atoms.

Exemplary of suitable hydrocarbon radicals are alkyl radicals such as methyl, ethyl, n-propyl, isopropyl, butyl, octyl, lauryl, myristyl, stearyl and the like; cycloaliphatic radicals such as cyclopentyl, cyclohexyl and the like; aryl radicals such as phenyl, methylphenyl, chlorophenyl and the like; alkaryl radicals such as benzyl and the like.

Particularly desirable titanates falling within the scope of this formula are those wherein each $R_1$ is alkyl having one to 18 carbon atoms, preferably one to 14 carbon atoms, exemplified by tetrabutyl titanate, tetraisopropyl titanate and the like.

Other suitable organo titanates can be conveniently prepared as described in U.S. Pat. No. 2,984,641 to Leon E. Wolinski patented May 16, 1961.

Still other suitable organo titanates are the organo titanium chelates such as tetraoctylene glycol titanium, triethanol amine titanate, titanium acetyl acetonate, titanium lactate and the like.

The amount of organo titanate catalyst added to the reaction mixture is a catalytic amount, sufficient to catalyze the reaction between the amino silane and the copolymer, preferably about 0.10 to about 2.0 percent by weight based on the weight of the copolymer.

The temperature at which this reaction is carried out is not critical and can vary, conveniently, from about 80° C. to about 300° C. and preferably from about 150° C. to about 230° C.

The reaction can be carried out at atmospheric, subatmospheric or superatmospheric pressures, although atmospheric pressure is preferred.

The course of the reaction is monitored by standard infra-red analysis.

The reaction can be carried out in any suitable apparatus, preferably an apparatus in which the copolymer is subjected to mechanical working such as a Brabender mixer, a Banbury mixer or an extruder. The amino silane can be added to the fluxed copolymer and the organo titanate then added. Alternatively, the organo titanate can be added to the copolymer prior to the addition of the amino silane. Also, organo titanate and amino silane can be premixed and added to the fluxed polymer.

Recovery of the amino silane modified copolymer is effected by allowing the contents of the reaction flask to cool and discharging into a suitable receiver for storage, preferably under an inert gas blanket.

The curing or crosslinking of the silane modified alkylene-alkyl acrylate copolymer is carried out by exposing the copolymer to moisture. The moisture present in the atmosphere is usually sufficient to permit curing to occur over a period of 48 hours.

The rate of curing, in a matter of 30 minutes, can be accelerated by exposure to an artificially humidified atmosphere or immersion in water, and heating to elevated temperatures or by exposure to steam.

Generally, curing is effected at temperatures on the order of about 23° C. to about 100° C., preferably about 70° C. to about 100° C.

Additionally, curing may be accelerated by the use of a silanol condensation catalyst such as dibutyl tin dilaurate or an organo titanate.

To the silane modified copolymers of this invention may be added various additives, in amounts well known in the art, such as fillers among which can be mentioned carbon black, clay, talc, magnesium silicate, calcium carbonate, silica, aluminum hydroxide and the like as further described in my copending application Ser. No. 070,785.

The silane modified copolymers can be rendered flame retardant by the addition thereto of halogen containing flame retardants such as decabromodiphenyl oxide, chlorinated polyethylene, polyvinyl chloride and halogenated paraffin waxes, alone, or in combination with antimony compounds such as antimony oxide and/or alkaline earth metal oxides, carbonates, hydroxides and sulfates. Among such alkaline earth metal compounds can be noted calcium oxide, calcium carbonate, calcium hydroxide, calcium sulfate, magnesium oxide, magnesium carbonate, magnesium hydroxide and magnesium sulfate.

The following example further illustrates the present invention and is not intended to limit the scope thereof.

EXAMPLE 1

A Brabender mixer was heated to a temperature of 160° C., maintained under a blanket of argon gas and charged with an ethylene-ethyl acrylate copolymer having a melt index of 4.5 and an ethyl acrylate content of 18 percent by weight. The copolymer was fluxed and 3 percent by weight of $\gamma$-aminopropyltriethoxysilane added thereto. The contents of the Brabender were mixed until homogeniety was achieved. Tetra-isopropyl titanate, in an amount of one percent by weight, was slowly added to the contents of the Brabender after which the contents of the Brabender were heated at a temperature of 155° to 160° C. for about 15 minutes.

The amino silane modified ethylene-ethyl acrylate copolymer produced was blended with five percent by weight of a masterbatch composition containing one percent by weight dibutyltindilaurate.

The masterbatch composition was prepared by admixing a quantity of an ethylene-vinyl acetate copolymer (10 percent by weight vinyl acetate—melt index of 2.0) with a 25 percent by weight solution of dibutyl tin dilaurate in isopropyl alcohol to produce a masterbatch containing one percent by weight dibutyl tin dilaurate. The isopropyl alcohol was removed by placing the masterbatch in a vacuum oven, which was at a temperature of 40° C., for about 12 hours. The masterbatch composition was stored under argon gas until use.

Samples of the composition containing the amino silane modified copolymer were formed into plaques, having dimensions of 3 inches by 8 inches by 0.075 inch, in a press, under the following conditions:

| Pressure | 5000 psi |
|---|---|
| Temperature | 130° C. |
| Time Cycle | 15 minutes |

Test plaques were cured by being immersed in water, which was at a temperature of 90° C., for 3 hours. The plaques were then removed from the water, wiped dry and placed in a vacuum oven, at a temperature of 50° C., for one hour to remove residual water.

The plaques were measured for cure according to the Monsanto Rheometer cure test. This test procedure is fully set forth in U.S. Pat. No. 4,017,852 granted Apr. 19, 1977, the disclosure of which is incorporated herein by reference. Briefly, FIG. 1 of the patent shows the typical Monsanto Rheometer curve. The cure level (highest crosslink density) is designated as H. It is measured in terms of inch-pounds of torque on the Rheometer test equipment. A higher value for H corresponds to a higher crosslink density.

Also, the plaques were measured for decalin extractables according to the test procedure of ASTMD-2765.

The decalin soluble portion of the composition is a quantitative measure of its degree of cure. The larger the weight percent value, the lower the degree of cure.

| Rheometer Torque Level (H) Inch-Pounds | 11 |
|---|---|
| Decalin Extractables Percent by Weight | 43.6 |

Comparable results are achieved using the following amino silanes in preparation of the amino silane modified copolymers.

1. N-$\gamma$($\beta$-aminoethyl)aminopropyltrimethoxysilane
2. $\gamma$-aminopropyltrimethoxysilane
3. $\beta$-aminoethyltrimethoxysilane

What is claimed is:

1. Water curable, amino silane modified alkylene-alkyl acrylate copolymers, free of halide salts and halide ions, which contain at least 50 percent by weight alpha olefin units having the formula:

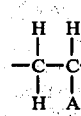

wherein A is hydrogen or an alkyl radical having one to 16 carbon atoms;

at least 0.1 percent by weight of polymerized units containing the radical having the formula:

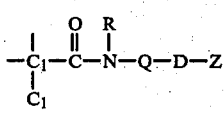

wherein: $C_1$ is a carbon atom in the main polymer chain, R is hydrogen or a hydrocarbon radical having one to 18 carbon atoms; Q is a hydrocarbon radical having one to 18 carbon atoms, bonded to —N— and —D— through carbon atoms; D is a silicon containing radical having the formula:

wherein V is hydrogen, a hydrocarbon radical having one to 18 carbon atoms or a hydrolyzable group and Z is a hydrolyzable group; and polymerized units having the formula:

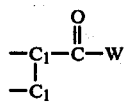

wherein $C_1$ is a carbon atom in the main polymer chain and W is an alkoxy radical having one to 18 carbon atoms.

2. A water curable, amino silane modified copolymer as defined in claim 1 wherein R is hydrogen, Q is a divalent hydrocarbon radical having one to 18 carbon atoms bonded to —N— and —D— through carbon atoms, V and Z are alkoxy radicals and W is an alkoxy radical having one to 18 carbon atoms.

3. A water curable, amino silane modified copolymer as defined in claim 1 wherein A is hydrogen, R is hydrogen, Q is —CH$_2$—CH$_2$— or —CH$_2$—CH$_2$—CH$_2$—, Z and V are methoxy, ethoxy or butoxy and W is an alkoxy radical of one to 18 carbon atoms.

4. A water curable, amino silane modified copolymer of an alkylene-alkyl acrylate copolymer free of halide salts and halide ions produced by reacting a mixture containing about 0.1 to about 10 percent by weight of an amino silane of the formula:

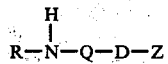

wherein R is hydrogen or a hydrocarbon radical, Q is a divalent hydrocarbon radical having one to 18 carbon atoms, bonded to —N— and —D— through carbon atoms; D is a silicon containing radical of the formula:

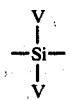

wherein V is hydrogen, a hydrocarbon radical having one to 18 carbon atoms or a hydrolyzable group and Z is a hydrolyzable group, an alkylene-alkyl acrylate copolymer and a catalytic amount of an organo titanate.

5. A water curable, amino silane modified copolymer produced as defined in claim 4 wherein the amino silane is γ-aminopropyltriethoxysilane.

6. A water curable, amino silane modified copolymer produced as defined in claim 4 wherein the copolymer is ethylene-ethyl acrylate.

7. A water curable, amino silane modified copolymer produced as defined in claim 4 wherein the copolymer is ethylene-ethyl acrylate and the amino silane is γ-aminopropyltriethoxysilane.

8. The crosslinked product of the composition defined in claim 1.

9. An electrical conductor insulated with the composition or crosslinked product of the composition defined in claim 1.

10. A water curable, silane modified copolymer as defined in claim 1 wherein the copolymer is ethylene-ethyl acrylate and the amino silane is γ-aminopropyltriethoxysilane.

* * * * *

UNITED STATES PATENT AND TRADEMARK OFFICE
CERTIFICATE OF CORRECTION

PATENT NO. : 4,343,917
DATED : August 10, 1982
INVENTOR(S) : Michael J. Keogh

It is certified that error appears in the above—identified patent and that said Letters Patent is hereby corrected as shown below:

Claim 4, first line after the first formula; "hydrocarbon radical" should read --hydrocarbon radical having one to 18 carbon atoms--.

Signed and Sealed this

Fifteenth Day of February 1983

[SEAL]

Attest:

GERALD J. MOSSINGHOFF

Attesting Officer  Commissioner of Patents and Trademarks